(12) United States Patent
Tang et al.

(10) Patent No.: US 8,465,854 B2
(45) Date of Patent: Jun. 18, 2013

(54) PERPENDICULAR MAGNETIC RECORDING MEDIA WITH THIN SOFT MAGNETIC UNDERLAYERS AND RECORDING SYSTEMS COMPRISING SAME

(75) Inventors: Li Tang, Fremont, CA (US); Weilu Xu, San Jose, CA (US); Youfeng Zheng, San Jose, CA (US); Shanghsien Rou, Fremont, CA (US); Connie Chunling Liu, San Jose, CA (US); Jianhua Xue, Maple Grove, MN (US); Li-Lien Lee, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 1286 days.

(21) Appl. No.: 11/606,998

(22) Filed: Dec. 1, 2006

(65) Prior Publication Data

US 2008/0131734 A1 Jun. 5, 2008

(51) Int. Cl.
*G11B 5/65* (2006.01)

(52) U.S. Cl.
USPC .......................................... 428/836

(58) Field of Classification Search
USPC ................. 428/827, 828, 828.1, 836
See application file for complete search history.

(56) References Cited

U.S. PATENT DOCUMENTS

| 6,468,670 | B1 | 10/2002 | Ikeda et al. | |
| 6,641,935 | B1 * | 11/2003 | Li et al. | 428/828.1 |
| 6,777,112 | B1 | 8/2004 | Girt et al. | |
| 6,893,748 | B2 * | 5/2005 | Bertero et al. | 428/828.1 |
| 7,201,977 | B2 * | 4/2007 | Li et al. | 428/829 |
| 2004/0247945 | A1 * | 12/2004 | Chen et al. | 428/694 TS |
| 2005/0214585 | A1 * | 9/2005 | Li et al. | 428/828 |

OTHER PUBLICATIONS

U.S. Appl. No. 11/399,507, filed Apr. 7, 2006.
U.S. Appl. No. 11/448,770, filed Jun. 8, 2006.

* cited by examiner

*Primary Examiner* — Mark Ruthkosky
*Assistant Examiner* — Gary Harris

(57) ABSTRACT

A perpendicular magnetic recording medium comprises a non-magnetic substrate having a surface; and a plurality of overlying thin film layers forming a layer stack on the substrate surface, the layer stack including a magnetically hard perpendicular magnetic recording layer structure and an underlying soft magnetic underlayer (SUL), the SUL having a thickness of up to about 100 Å. Also disclosed is a data/information recording, storage, and retrieval system comprising the perpendicular magnetic recording medium and a single-pole magnetic transducer head including main and auxiliary poles positioned in spaced adjacency to an upper surface of the layer stack, the single-pole transducer head comprising a front shield adjacent the main pole.

20 Claims, 3 Drawing Sheets

PERPENDICULAR MAGNETIC RECORDING MEDIA WITH THIN SOFT MAGNETIC UNDERLAYERS AND RECORDING SYSTEMS COMPRISING SAME

FIELD OF THE INVENTION

The present invention relates to improved perpendicular magnetic recording media with very thin magnetically soft underlayers (SUL's) and magnetic recording systems comprising the improved media with write heads including front shields. The invention has particular utility in the manufacture and use of very high areal recording density perpendicular magnetic recording media, e.g., hard disk media utilized in computer-related applications.

BACKGROUND OF THE INVENTION

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Perpendicular recording media have been found to be superior to longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

At present, efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 1 kOe, such as of a NiFe alloy (Permalloy), between a non-magnetic substrate, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the magnetically hard perpendicular recording layer.

A typical conventional perpendicular recording system 10 with a perpendicularly oriented magnetic medium 1 and a magnetic transducer head 9 is schematically illustrated in cross-section in FIG. 1, wherein reference numeral 2 indicates a non-magnetic substrate, reference numeral 3 indicates an optional adhesion layer, reference numeral 4 indicates a relatively thick magnetically soft underlayer (SUL), reference numeral 5 indicates an interlayer stack comprising at least one non-magnetic interlayer, sometimes referred to as an "intermediate" layer, and reference numeral 6 indicates at least one relatively thin magnetically hard perpendicular recording layer with its magnetic easy axis perpendicular to the film plane. Interlayer stack 5 commonly includes at least one interlayer $5_B$ of a hcp material adjacent the magnetically hard perpendicular recording layer 6 and an optional seed layer $5_A$ adjacent the magnetically soft underlayer (SUL) 4, typically comprising at least one of an amorphous material and an fcc material.

Still referring to FIG. 1, reference numerals $9_M$ and $9_A$, respectively, indicate the main (writing) and auxiliary poles of the magnetic transducer head 9. The relatively thin interlayer 5, comprised of one or more layers of non-magnetic materials, serves to (1) prevent magnetic interaction between the magnetically soft underlayer 4 and the at least one magnetically hard recording layer 6; and (2) promote desired microstructural and magnetic properties of the at least one magnetically hard recording layer 6.

As shown by the arrows in the figure indicating the path of the magnetic flux φ, flux φ emanates from the main writing pole $9_M$ of magnetic transducer head 9, enters and passes through the at least one vertically oriented, magnetically hard recording layer 6 in the region below main pole $9_M$, enters and travels within soft magnetic underlayer (SUL) 4 for a distance, and then exits therefrom and passes through the at least one perpendicular hard magnetic recording layer 6 in the region below auxiliary pole $9_A$ of transducer head 9. The relative direction of movement of perpendicular magnetic medium 21 past transducer head 9 is indicated in the figure by the arrow in the figure.

Completing the layer stack of medium 1 is a protective overcoat layer 7, such as of a diamond-like carbon (DLC), formed over magnetically hard layer 6, and a lubricant topcoat layer 8, such as of a perfluoropolyether (PFPE) material, formed over protective overcoat layer 7.

Substrate 2 is typically disk-shaped and comprised of a non-magnetic metal or alloy, e.g., Al or an Al-based alloy, such as Al—Mg having a Ni—P plating layer on the deposition surface thereof, or alternatively, substrate 2 is comprised of a suitable glass, ceramic, glass-ceramic, polymeric material, or a composite or laminate of these materials. Optional adhesion layer 3, if present on substrate surface 2, typically comprises a less than about 200 Å thick layer of a metal or a metal alloy material such as Ti, a Ti-based alloy, Ta, a Ta-based alloy, Cr, or a Cr-based alloy. The relatively thick soft magnetic underlayer 4 is typically comprised of a thick (500 Å or greater) layer of a soft magnetic material such as Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. Relatively thin interlayer stack 5 typically comprises an about 50 to about 300 Å thick layer or layers of non-magnetic material(s). Interlayer stack 5 includes at least one interlayer $5_A$ of a hcp material, such as Ru, TiCr, Ru/CoCr$_{37}$Pt$_6$, RuCr/CoCrPt, etc., adjacent the magnetically hard perpendicular recording layer 6. When present, seed layer $5_B$ adjacent the magnetically soft underlayer (SUL) 4 may typically include a less than about 100 Å thick layer of an fcc material, such as an alloy of Cu, Ag, Pt, or Au, or an amorphous or fine-grained material, such as Ta, TaW, CrTa, Ti, TiN, TiW, or TiCr. The at least one magnetically hard perpendicular recording layer 6 is typically comprised of an about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd. Alternatively, the magnetically hard perpendicular recording layer 6 may be comprised of a stacked multilayer structure, such as magnetically coupled continuous and discontinuous magnetic layers. When the latter layer comprises a granular magnetic layer, the multilayer structure is termed a "coupled granular-continuous" or "CGC" structure.

As indicated above, the principal role of the SUL 4 in currently available perpendicular magnetic recording media is to enhance the strength of the perpendicular component of the writing field of the main pole of the write head. In order to achieve good writability, and therefore good recording performance, the SUL of current perpendicular media typically must be at least about 500 Å thick in order to afford full utilization of its field enhancing effect via perfect imaging of the main pole writing field. However, use of such thick SUL thicknesses incurs a number of disadvantages, including reduced manufacturing throughput necessitated by the lengthy interval required for deposition of the thick SUL, increased frequency of defects, and increased manufacturing cost. In addition, the thick SUL may induce domain wall spike noise in the event it is not adequately magnetically decoupled from the recording layer(s) or aligned therewith. Further in addition, it is generally observed that the thicker the SUL, the wider the data track erase band, thereby limiting the track/in. ("tpi") capability of the media in high areal recording density applications.

In view of the foregoing, there exists a clear need for improved perpendicular media with thinner SUL's than are currently available, which media still provide good recording performance associated with perpendicular magnetic recording media. In addition, there exists a clear need for improved magnetic recording systems comprising perpendicular media with thin SUL's.

SUMMARY OF THE INVENTION

An advantage of the present invention is improved perpendicular magnetic recording media.

Another advantage of the present invention is improved perpendicular magnetic recording media comprising very thin soft magnetic underlayers (SUL's).

Yet another advantage of the present invention is improved perpendicular data/information recording, storage and retrieval systems comprising improved perpendicular magnetic recording media comprising very thin SUL's and single-pole transducer heads with main pole shields.

Still another advantage of the present invention is a method of manufacturing improved perpendicular magnetic recording media comprising very thin SUL's.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved perpendicular magnetic recording medium, comprising:

(a) a non-magnetic substrate having a surface; and (b) a plurality of overlying thin film layers forming a layer stack on the substrate surface, the layer stack including a magnetically hard perpendicular magnetic recording layer structure and an underlying soft magnetic underlayer (SUL), the SUL having a thickness up to about 100 Å.

In accordance with embodiments of the present invention, the magnetically hard perpendicular magnetic recording layer structure comprises a multilayer structure. Preferably, the multilayer structure comprises a granular perpendicular magnetic recording layer wherein the magnetic grains are only weakly exchange coupled together, and an overlying continuous perpendicular magnetic recording layer wherein the magnetic grains are strongly exchange coupled laterally together, and the granular perpendicular magnetic recording layer and the continuous perpendicular magnetic recording layer are ferromagnetically coupled together to form a coupled granular-continuous (CGC) structure.

According to embodiments of the present invention, the granular perpendicular magnetic recording layer is from about 5 to about 30 nm thick and comprised of a Co-based alloy wherein segregation of magnetic grains occurs via formation of oxides, nitrides, or carbides at the boundaries between adjacent grains; and the continuous perpendicular magnetic recording layer is from about 2 to about 15 nm thick and comprised of one or more layers of a Co-based alloy.

Preferably, the layer stack further comprises at least one interlayer between the multilayer perpendicular magnetic recording structure and the SUL, the at least one interlayer comprises a Ru-containing material, e.g., RuX, where X is at least one of B and Cr.

Another aspect of the present invention is an improved perpendicular magnetic data/information recording, storage, and retrieval system, comprising the above-described thin SUL perpendicular magnetic recording medium and a single-pole magnetic transducer head including main and auxiliary poles positioned in spaced adjacency to an upper surface of the layer stack, the single-pole transducer head comprising a front shield adjacent the main pole.

Yet another aspect of the present invention is an improved method of manufacturing a perpendicular magnetic recording medium, comprising steps of:

(a) providing a non-magnetic substrate having a surface; and (b) forming on the substrate surface a plurality of overlying thin film layers comprising a layer stack, the layer stack including a magnetically hard perpendicular magnetic recording layer structure and an underlying soft magnetic underlayer (SUL), the SUL having a thickness of up to about 100 Å.

According to embodiments of the present invention, step (b) comprises forming the magnetically hard perpendicular magnetic recording layer structure with a multilayer structure. Preferably, step (b) comprises forming the multilayer structure with a granular perpendicular magnetic recording layer wherein the magnetic grains are only weakly exchange coupled together, and an overlying continuous perpendicular magnetic recording layer wherein the magnetic grains are strongly exchange coupled laterally together, and step (b) comprises forming a coupled granular-continuous (CGC) structure wherein the granular perpendicular magnetic recording layer and the continuous perpendicular magnetic recording layer are ferromagnetically coupled together.

In accordance with embodiments of the present invention, step (b) comprises forming the granular perpendicular magnetic recording layer at a thickness from about 5 to about 30 nm and comprised of a Co-based alloy wherein segregation of magnetic grains occurs via formation of oxides, nitrides, or carbides at the boundaries between adjacent grains; and step (b) comprises forming the granular perpendicular magnetic recording layer by introducing a minor amount of at least one reactive gas selected from the group consisting of oxygen ($O_2$), nitrogen ($N_2$), and carbon (C)-containing gases to an inert gas atmosphere during sputter deposition thereof.

According to embodiments of the present invention, step (b) comprises forming the continuous perpendicular magnetic recording layer at a thickness from about 2 to about 15 nm and comprised of one or more layers of a Co-based alloy.

Further embodiments of the present invention include those wherein step (b) comprises forming the layer stack as to include at least one interlayer between the multilayer perpendicular magnetic recording structure and the SUL. Preferably, step (b) comprises forming the at least one interlayer as to include a Ru-containing material, the Ru-containing material comprising RuX, where X=at least one of B and Cr.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the same reference numerals are employed throughout for designating the same or similar features, and wherein the various features are not necessarily drawn to scale but rather are drawn as to best illustrate the pertinent features, wherein.

DETAILED DESCRIPTION OF THE INVENTION

The present invention is based upon recognition that perpendicular media with thin SUL's and exhibiting good writability can be achieved by appropriate selection of the structure, composition, and thickness of the magnetically hard recording layer structure. In addition, the present invention is based upon recognition that the performance of magnetic recording systems comprising perpendicular media with thin SUL's is materially improved by use of single pole write heads equipped with front shields adjacent the main pole thereof, thereby enhancing the perpendicular field component and controlling the field angle, hence enhancing the effective write field for providing optimal recording performance.

Figure 1:
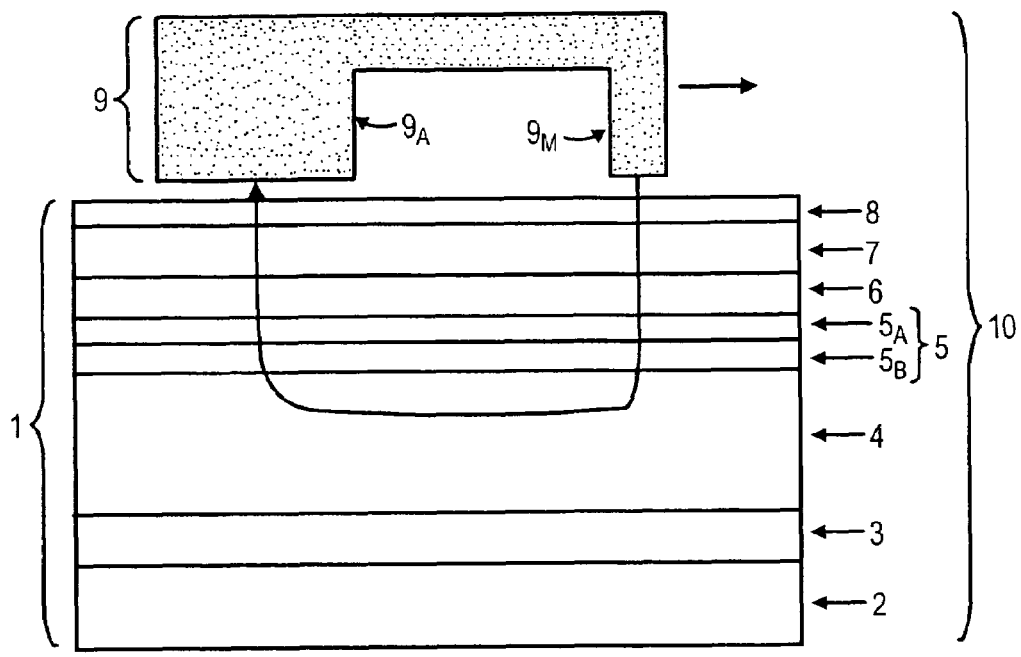
FIG. 1 schematically illustrates, in simplified cross-sectional view, a portion of a magnetic recording, storage, and retrieval system according to the conventional art, comprised of a conventionally structured perpendicular magnetic recording medium and a single-pole magnetic transducer head.
Figure 2:
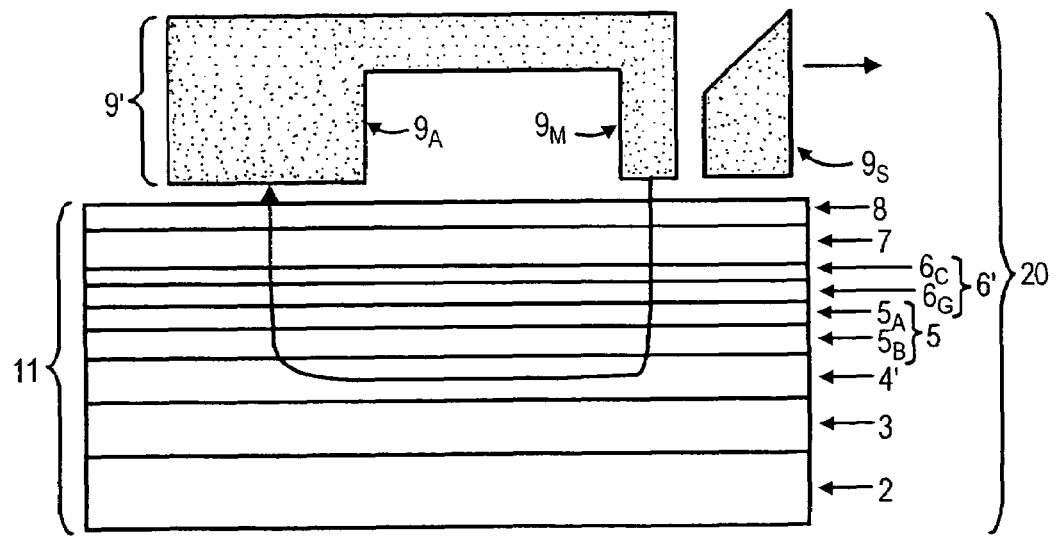
FIG. 2 schematically illustrates, in simplified cross-sectional view, a portion of a magnetic recording, storage, and retrieval system according to an illustrative, but non-limitative, embodiment of the present invention, comprised of a perpendicular magnetic recording medium with a thin soft magnetic underlayer (SUL) and a single-pole magnetic transducer head equipped with a front shield

Referring to FIG. 2, schematically illustrated therein, in simplified cross-sectional view, is a portion of a magnetic recording, storage, and retrieval system 20 according to an illustrative, but non-limitative, embodiment of the present invention, comprised of a perpendicular magnetic recording medium 11 structured for use with a modified magnetic transducer head 9'. Medium 11 according to the present invention generally resembles the conventional perpendicular medium 1 of FIG. 1, and comprises a series of thin film layers arranged in an overlying (i.e., stacked) sequence on a non-magnetic substrate 2 comprised of a non-magnetic material selected from the group consisting of: Al, Al—Mg alloys, other Al-based alloys, NiP-plated Al or Al-based alloys, glass, ceramics, glass-ceramics, polymeric materials, and composites or laminates of these materials.

The thickness of substrate 2 is not critical; however, in the case of magnetic recording media for use in hard disk applications, substrate 2 must be of a thickness sufficient to provide the necessary rigidity. Substrate 2 typically comprises Al or an Al-based alloy, e.g., an Al—Mg alloy, or glass or glass-ceramics, and, in the case of Al-based substrates, includes a plating layer, typically of NiP, on the surface of substrate 2 (not shown in the figure for illustrative simplicity). An optional adhesion layer 3, typically a less than about 100 Å thick layer of an amorphous metallic material or a fine-grained material, such as a metal or a metal alloy material, e.g., Ti, a Ti-based alloy, Ta, a Ta-based alloy, Cr, or a Cr-based alloy, may be formed over the surface of substrate 2 or the NiP plating layer thereon.

Overlying substrate 2 or optional adhesion layer 3 is a thin magnetically soft underlayer (SUL) 4' formed according to the principles of the present invention. In accordance with embodiments of the present invention, the SUL 4' is substantially thinner than SUL 4 of conventional medium 1 and comprises a layer of a magnetically soft material up to about 100 Å thick, selected from the group consisting of: Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC.

As in conventional medium 1, an optional adhesion layer 3 may be included in the layer stack of medium 11 between the surface of substrate surface 2 and the SUL 4', the adhesion layer 3 being less than about 200 Å thick and comprised of a metal or a metal alloy material such as Ti, a Ti-based alloy, Ta, a Ta-based alloy, Cr, or a Cr-based alloy.

Still referring to FIG. 2, the layer stack of medium 11 further comprises a non-magnetic interlayer stack 5 between SUL 4' and overlying multilayer perpendicular magnetic recording structure 6' and is comprised of non-magnetic material(s). For example, interlayer stack 5 may typically include at least one interlayer $5_A$ adjacent the multilayer perpendicular magnetic recording structure 6', comprising a layer of a hcp material from about 5 to about 50 nm thick, such as Ru, TiCr, Ru/CoCr$_{37}$Pt$_6$, RuCr/CoCrPt, or RuX, where X is at least one of B and Cr. When present, seed layer $5_B$ adjacent the magnetically soft underlayer (SUL) 4' may typically include a less than about 100 Å thick layer of an fcc material, such as an alloy of Cu, Ag, Pt, or Au, or an amorphous or fine-grained material, such as Ta, TaW, CrTa, Ti, TiN, TiW, or TiCr.

According to the embodiment of the invention, the multilayer perpendicular magnetic recording structure 6' is typically comprised of a granular perpendicular magnetic recording layer $6_G$ adjacent interlayer $5_A$ and an overlying continuous perpendicular magnetic recording layer $6_C$. The resultant multilayer structure 6', termed a "coupled granular-continuous", or "CGC" structure, exhibits high areal recording densities with enhanced magnetic performance characteristics. According to such multilayer stacked CGC structure, the granular perpendicular recording layer, wherein the magnetic grains are only weakly exchange coupled together, and the continuous perpendicular recording layer, wherein the magnetic grains are strongly exchange coupled laterally, are ferromagnetically coupled together.

Typically, the granular perpendicular magnetic recording layer $6_G$ is from about 5 to about 30 nm thick and comprised of a Co-based alloy wherein segregation of magnetic grains occurs via formation of oxides, nitrides, or carbides at the boundaries between adjacent grains. The oxides, nitrides, or carbides may be formed by introducing a minor amount of at least one reactive gas, e.g., oxygen ($O_2$), nitrogen ($N_2$), or a carbon (C)-containing gas to the inert gas (e.g., Ar) atmosphere during deposition (e.g., sputter deposition) thereof. By way of illustration only, granular perpendicular magnetic recording layer $6_G$ may be comprised of a CoCrPt—X material, wherein X is selected from the group consisting of oxides, nitrides, and carbides, e.g., CoCrPt—$SiO_2$, CoCrPt—$SiN_x$, and CoCrPt—SiC.

Typically, the continuous perpendicular magnetic recording layer $6_C$ is from about 2 to about 15 nm thick and comprised of one or more layers of a Co-based alloy, e.g., a CoCrPtX alloy, where X is at least one element selected from the group consisting of: Pt, Fe, Tb, Ta, B, C, Mo, V, Nb, W, Zr, Re, Ru, Ag, Hf, Ir, Si, and Y. Preferably, the at least one perpendicular magnetic recording layer $6_C$ comprises a fine-grained hcp alloy with a preferred c-axis perpendicular growth orientation.

Finally, the layer stack of medium 11 includes a protective overcoat layer 7 above the multilayer perpendicular magnetic recording structure 6' and a lubricant topcoat layer 8 over the protective overcoat layer 7. Preferably, the protective overcoat layer 7 comprises a carbon-based material, e.g., diamond-like carbon ("DLC"), and the lubricant topcoat layer 8 comprises a fluoropolymer material, e.g., a perfluoropolyether compound.

According to the invention, each of the layers 3, 4', 5, 6', 7 may be deposited or otherwise formed by techniques typically utilized for formation of thin film layers, e.g., physical vapor deposition ("PVD") techniques, including but not limited to, sputtering, vacuum evaporation, ion plating, cathodic arc deposition ("CAD"), etc., or by any combination of various PVD techniques. The lubricant topcoat layer 8 may be provided over the upper surface of the protective overcoat layer 7 in any convenient manner, e.g., as by dipping the thus-formed medium into a liquid bath containing a solution of the lubricant compound.

With continued reference to FIG. 2, as schematically illustrated therein, magnetic data/information recording, storage, and retrieval system 20 includes a modified transducer head 9' positioned in close proximity to the upper surface of medium 11, i.e., the upper surface of lubricant topcoat layer 8, and includes a front shield $9_S$ adjacent the main pole $9_M$. As indicated above, single pole write heads equipped with front shields adjacent the main pole thereof exhibit an enhanced perpendicular field component and controlled field angle, thereby having an enhanced effective write field for providing optimal recording performance.

Figure 3:
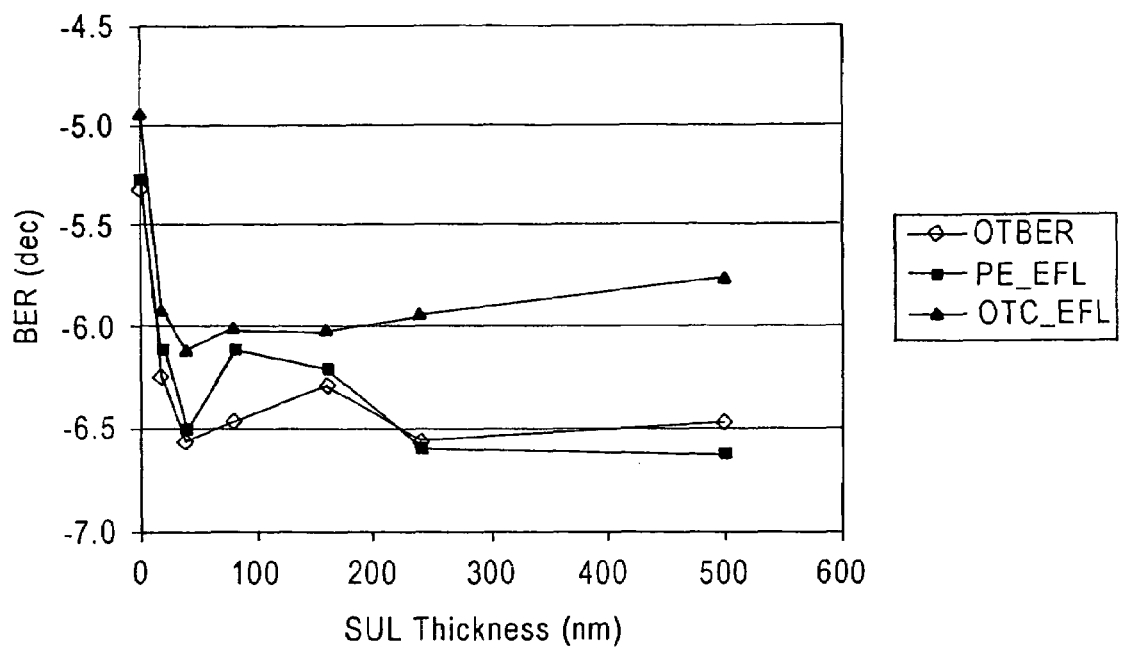
FIG. 3 is a graph illustrating the recording performance of perpendicular magnetic recording media comprising CGC-structured multilayer recording layer, as a function of SUL thickness.

Referring now to FIG. 3, shown therein is a graph illustrating the recording performance of perpendicular magnetic recording media comprising a CGC-structured multilayer recording layer, as a function of SUL thickness, wherein: "BER"=bit error rate; "OTBER"=on-track bit error rate of a data track on an AC erased background; "PE_EFL"=on-track bit error rate of a data track written on a background of pre-written data; and "OTC_EFL"=on-track bit error rate of a data track written on a background of pre-written data and with adjacent written tracks.

As is evident from FIG. 3, perpendicular media with thin SUL's according to the invention exhibit better, or at least comparable performance at 1168 kbpi when compared with conventional perpendicular media with thick SUL's. In point of fact, in the SUL thickness range up to about 500 Å, optimal OTC BER's have been obtained at SUL thicknesses as low as about 40 Å, i.e., significantly thinner than the 500 Å thickness of SUL's of currently available perpendicular media. This result also indicates that the thin SUL's of the present invention enlarge the field angle and improve the effective writing field.

Figure 4:
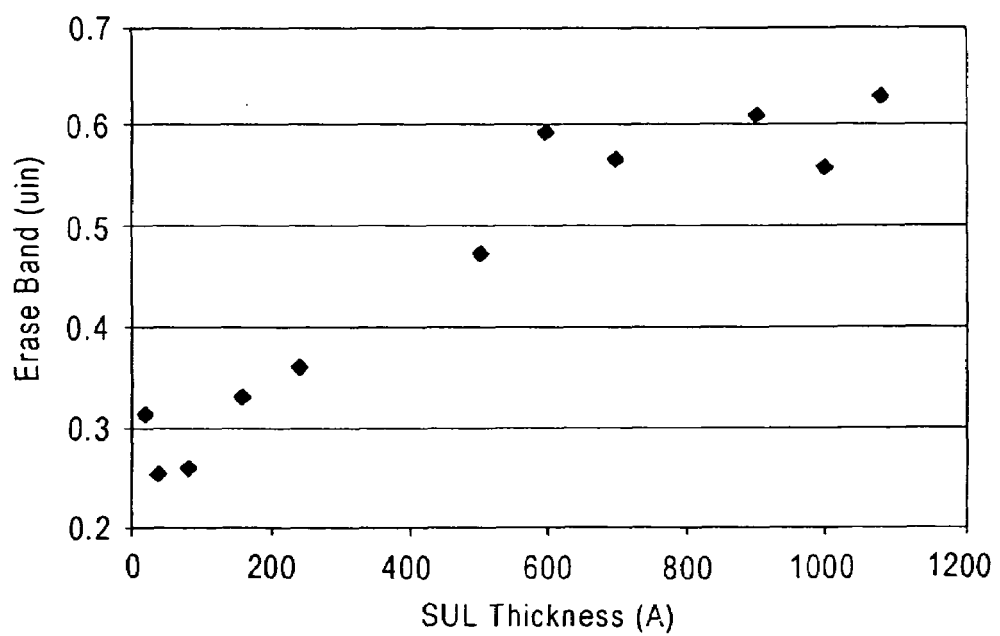
FIG. 4 is a graph illustrating the dependence of erase band width of perpendicular magnetic recording media comprising a CGC-structured multilayer recording layer, as a function of SUL thickness.

Adverting to FIG. 4, shown therein is a graph illustrating the dependence of erase band width of perpendicular magnetic recording media comprising a CGC-structured multilayer recording layer, as a function of SUL thickness. As is apparent from FIG. 4, perpendicular media with thin SUL's according to the invention (i.e., ~100 Å or less) exhibit erase band widths which are at least 50% narrower than those of currently available perpendicular media with thicker SUL's. Potential advantages of the narrower erase band widths afforded by the thin SUL media according to the invention are increased media tpi capability and greater tolerance of larger write pole widths.

Figure 5B:
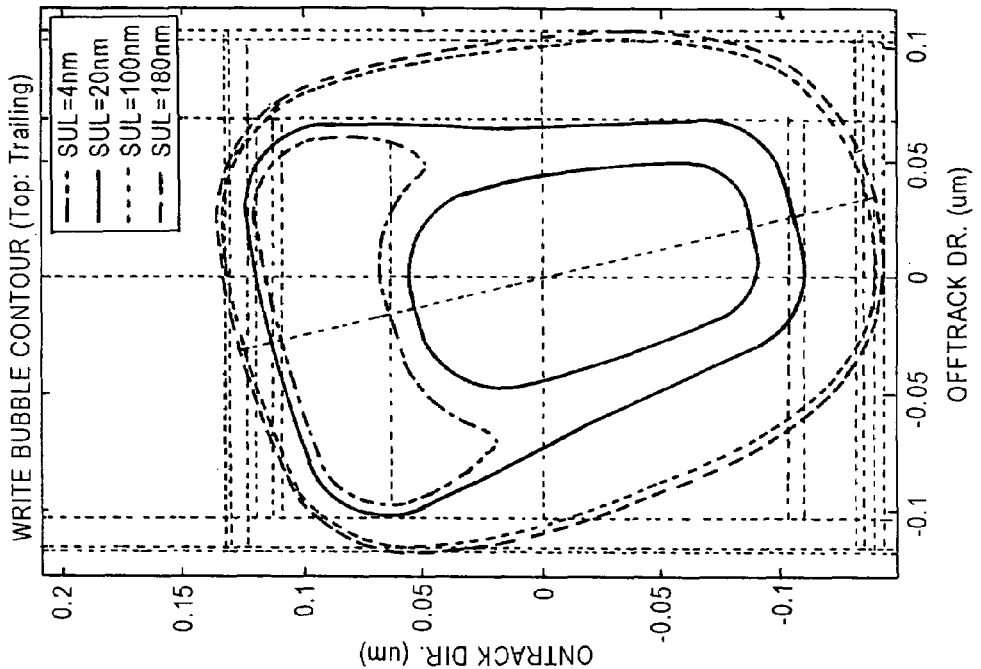
FIGS. 5 (A) and 5 (B) show the variations of numerically simulated head field conforming footprints of perpendicular media as a function of SUL thickness, at skew angles of 0° and 14°, respectively.
Figure 5A:
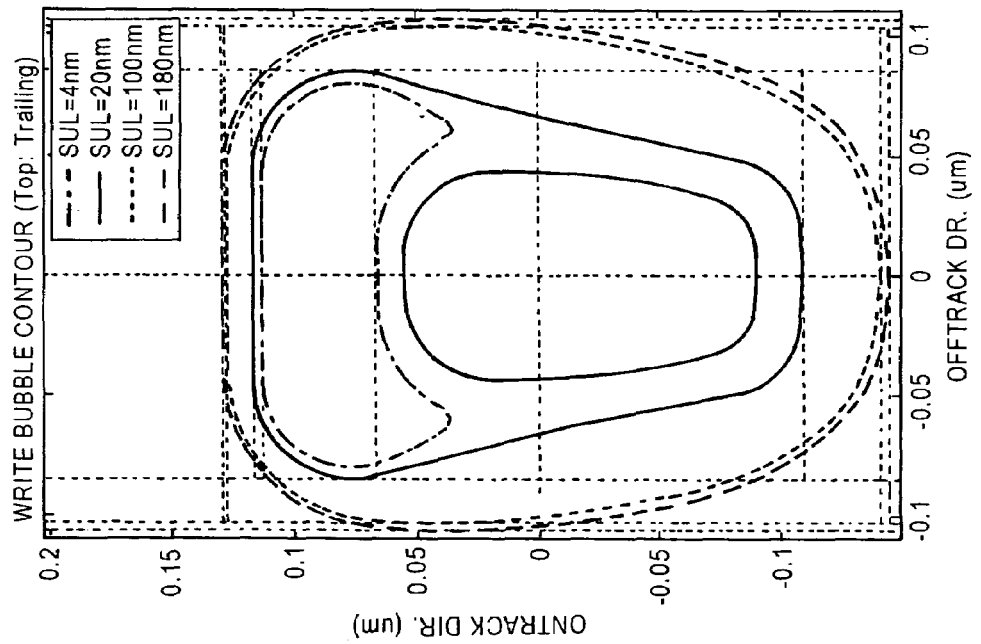

With reference to FIGS. 5 (A) and 5 (B), shown therein are the variations of numerically simulated head field conforming footprints of perpendicular media as a function of SUL thickness, at skew angles of 0° and 14°, respectively. Such simulations indicate that for perpendicular media with thin SUL's according to the invention have much smaller head field conforming footprints than conventional thick SUL perpendicular media in both the down-track and cross-track directions. The trailing edge transition curvature of the thin SUL media is less in the cross-track direction and the magnetic wall angle is larger, compared to the thick SUL media. As a consequence, perpendicular media with thin SUL's according to the invention are advantageously more tolerant to large head skew angles and more likely to be written with straight transitions.

Additional advantages afforded by the thin SUL perpendicular recording media of the present invention include increased flexibility in accommodating different write head designs and clearance specifications by varying the SUL thickness as to optimize the effective field strength and angle for achieving improved recording performance, relative to the currently available thick SUL media.

Thus, the present invention advantageously provides improved performance, high areal density, magnetic alloy-based perpendicular magnetic media and data/information recording, storage, and retrieval systems, which media include very thin soft magnetic underlayers (SUL's) which afford improved performance characteristics when utilized in combination with single pole magnetic transducer heads. The media of the present invention enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A perpendicular magnetic recording medium, comprising:
    (a) a non-magnetic substrate having a surface; and
    (b) a plurality of overlying thin film layers forming a layer stack on said substrate surface, said layer stack including a magnetically hard perpendicular magnetic recording layer structure and an underlying soft magnetic underlayer (SUL),
    wherein said perpendicular magnetic recording medium has only one SUL, and said SUL has a thickness up to about 100 Å.

2. The medium as in claim 1, wherein:
    said magnetically hard perpendicular magnetic recording layer structure comprises a multilayer structure.

3. The medium as in claim 2, wherein:
    said multilayer structure comprises a granular perpendicular magnetic recording layer wherein the magnetic grains are only weakly exchange coupled together, and an overlying continuous perpendicular magnetic recording layer wherein the magnetic grains are strongly exchange coupled laterally together.

4. The medium as in claim 3, wherein:
    said granular perpendicular magnetic recording layer and said continuous perpendicular magnetic recording layer are ferromagnetically coupled together to form a coupled granular-continuous (CGC) structure.

5. The medium as in claim 3, wherein:
    said granular perpendicular magnetic recording layer is from about 5 to about 30 nm thick and comprised of a Co-based alloy wherein segregation of magnetic grains occurs via formation of oxides, nitrides, or carbides at the boundaries between adjacent grains.

6. The medium as in claim 3, wherein:
    said continuous perpendicular magnetic recording layer is from about 2 to about 15 nm thick and comprised of one or more layers of a Co-based alloy.

7. The medium as in claim 3, wherein:
    said layer stack further comprises at least one interlayer between said multilayer perpendicular magnetic recording structure and said SUL.

8. The medium as in claim 7, wherein:
    said at least one interlayer comprises a Ru-containing material.

9. The medium as in claim 8, wherein:
    said Ru-containing material comprises RuX, where X is at least one of B and Cr.

10. A perpendicular magnetic data/information recording, storage, and retrieval system, comprising a perpendicular magnetic recording medium as in claim 1 and a single-pole magnetic transducer head including main and auxiliary poles positioned in spaced adjacency to an upper surface of said layer stack, said single-pole transducer head comprising a front shield adjacent said main pole.

11. A perpendicular magnetic recording medium, comprising:
    (a) a non-magnetic substrate having a surface; and
    (b) a plurality of overlying thin film layers forming a layer stack on said substrate surface, said layer stack including a magnetically hard perpendicular magnetic recording layer structure and an underlying soft magnetic underlayer (SUL),
    wherein said perpendicular magnetic recording medium has only one SUL, and
    said SUL has a thickness of about 40 Å to about 100 Å,
    wherein the magnetically hard perpendicular magnetic recording layer structure comprises a granular perpendicular magnetic recording layer wherein the magnetic grains are exchange coupled together, and an overlying continuous perpendicular magnetic recording layer wherein the magnetic grains are exchange coupled laterally together, and the magnetic grains in the continuous perpendicular layer are more strongly exchange coupled than the magnetic grains in the granular perpendicular magnetic recording layer.

12. The medium as in claim 11, wherein:
    said granular perpendicular magnetic recording layer and said continuous perpendicular magnetic recording layer are ferromagnetically coupled together to form a coupled granular-continuous (CGC) structure.

13. The medium as in claim 11, wherein:
    said granular perpendicular magnetic recording layer is from about 5 to about 30 nm thick and comprised of a Co-based alloy wherein segregation of magnetic grains occurs via formation of oxides, nitrides, or carbides at the boundaries between adjacent grains.

14. The medium as in claim 11, wherein:
    said continuous perpendicular magnetic recording layer is from about 2 to about 15 nm thick and comprised of one or more layers of a Co-based alloy.

15. The medium as in claim 11, wherein:
    said layer stack further comprises at least one interlayer between said multilayer perpendicular magnetic recording structure and said SUL.

16. A perpendicular magnetic recording medium, comprising:
    (a) a non-magnetic substrate having a surface; and
    (b) a plurality of overlying thin film layers forming a layer stack on said substrate surface, said layer stack including a magnetically hard perpendicular magnetic recording layer structure and an underlying soft magnetic underlayer (SUL),
    wherein said perpendicular magnetic recording medium has only one SUL, and
    said SUL has a thickness of about 40 Å to about 100 Å,
    wherein said layer stack further comprises at least one Ru-containing material interlayer between said perpendicular magnetic recording layer and said SUL.

17. The medium as in claim 16, wherein:
    said Ru-containing material comprises RuX, where X is at least one of B and Cr.

18. The medium as in claim 16, wherein:
    the magnetically hard perpendicular magnetic recording layer structure comprises a granular perpendicular magnetic recording layer wherein the magnetic grains are exchange coupled together, and an overlying continuous perpendicular magnetic recording layer wherein the magnetic grains are exchange coupled laterally together, and the magnetic grains in the continuous perpendicular layer are more strongly exchange coupled than the magnetic grains in the granular perpendicular magnetic recording layer.

19. The medium as in claim 16, wherein:
said granular perpendicular magnetic recording layer and said continuous perpendicular magnetic recording layer are ferromagnetically coupled together to form a coupled granular-continuous (CGC) structure.

20. The medium as in claim 16, wherein:
said granular perpendicular magnetic recording layer is from about 5 to about 30 nm thick and comprised of a Co-based alloy wherein segregation of magnetic grains occurs via formation of oxides, nitrides, or carbides at the boundaries between adjacent grains.

* * * * *